Feb. 20, 1940. R. SELIGMAN 2,191,044
LIQUID TREATING APPARATUS OF THE BUILT-UP TYPE
Filed Nov. 5, 1938
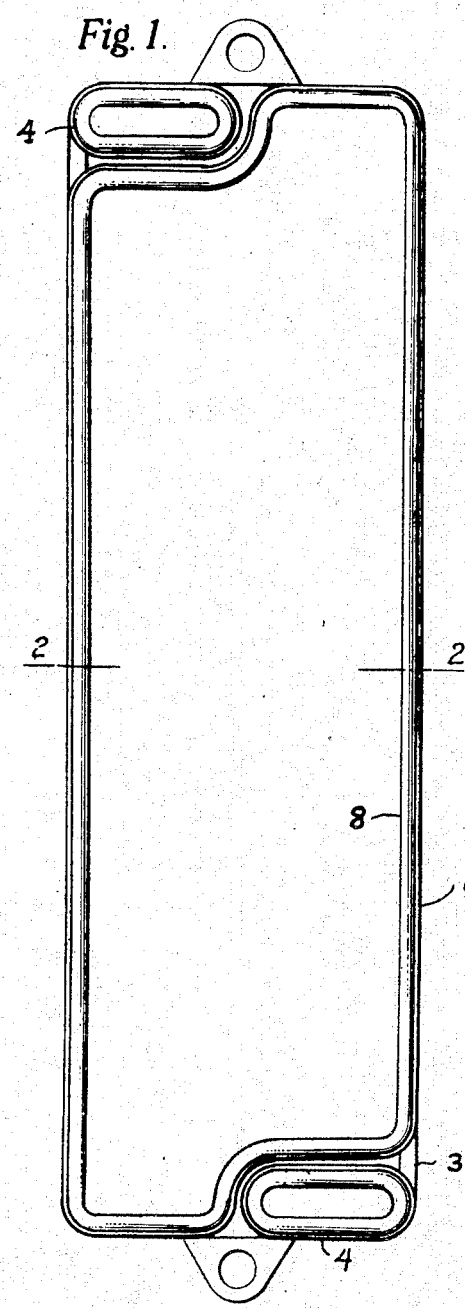
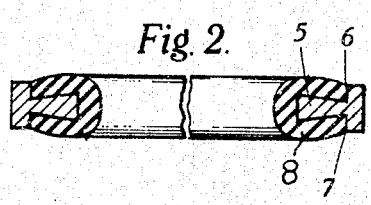
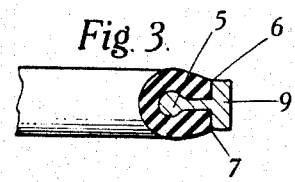
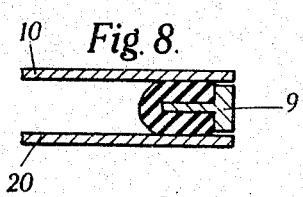
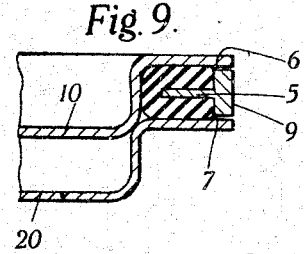
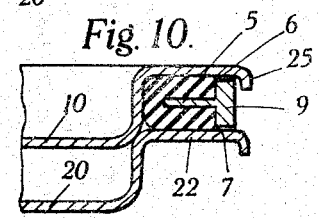
Inventor
R. SELIGMAN
By Young, Emery & Thompson
Attorneys Patented Feb. 20, 1940

2,191,044

UNITED STATES PATENT OFFICE 2,191,044

LIQUID TREATING APPARATUS OF THE BUILT-UP TYPE

Richard Seligman, Point Pleasant, Wandsworth, London, England, assignor to The Aluminium Plant & Vessel Company Limited, Point Pleasant, Wandsworth, London, England, a British company Application November 5, 1938, Serial No. 239,135
In Great Britain November 10, 1937

10 Claims. (Cl. 257—245)

This invention relates to apparatus of the built-up type applicable to heat exchange and filtration purposes and is particularly concerned with apparatus of this type in which the elements or plates are separated or spaced the required distance from one another by spacing members constituted by open frames of rectangular, annular or other formation.

It is known to provide the aforesaid frames or spacing members with grooves or channels for the reception of resilient packing strips such as rubber but it has been recognised that, in some instances, the formation of such grooves is undesirable and one of the objects of the present invention is to provide an improved form of frame and resilient packing.

According to one feature of the invention the resilient packing material is disposed around the inner edge of the open frame and means may be provided for preventing the resilient packing material from spreading in an outward direction when compressed between the marginal edges of the adjacent elements or plates.

The aforesaid means may be constituted by a part or parts of the frame or by a part or parts of the resilient packing material or strip. For example, the frame may be shouldered or bent to provide means for preventing the spreading of the resilient material or the packing material or strip may be formed in part of resilient or compressible material such as soft rubber and in part of hard or non-compressible material such as hard rubber or the like.

According to another feature of the invention the marginal edges of the elements or plates between which the frames are disposed are formed to provide the same with a depression or an L-shaped edge for the accommodation of the frame in such a manner that a portion of the depression or L-shaped part is disposed within the inner edge of the frame to restrain the resilient material or strip, and enclose the inner face of the joint between the shoulders of the frame and the adjacent elements or plates.

According to another feature of the invention the marginal elements or plates between which the frames are disposed are so formed as to restrain the frames from movements outwards.

In order that the said invention may be clearly understood and readily carried into effect the same will now be more fully described with reference to the accompanying drawing, in which:

Fig. 1 shows one form of frame member for a heat exchanger according to the present invention;

Fig. 2 shows a cross section of Fig. 1 on the line 2—2;

Figs. 3 to 7 show alternative sections of the frame member; and

Figs. 8, 9 and 10 show alternative modes of arranging or accommodating the frame member between two plates of a heat exchanger.

The frame member shown in Fig. 1 consists of an open rigid metal frame 3 which is formed with a pair of transfer ports 4 and the inner marginal edge of which is reduced in thickness as at 5 and formed with a pair of shoulders 6 and 7 (Figs. 2 and 3). The resilient packing material, for example, rubber, instead of being accommodated in grooves in the frame member is in this instance, formed so that it consists of a strip 8 extending over both sides of the portion of reduced thickness and around the inner edge of the frame with its ends or side walls abutting against the shouldered portions of the frame so that the shoulders serve to prevent the resilient material from spreading outwardly along the joint between the frame and the adjacent heat exchange plates (see Figs. 8 and 9) or to the outer surface of the stack of heat exchange plates and frames when under compression. As will be seen from Figs. 8, 9 and 10, which figures show a frame member incorporating the invention arranged in position between the marginal edges of a pair of heat exchange plates 10 and 20, the portion 9 of the frame serving to restrain the packing material against outward movement may also be utilised to limit the extent to which the plates may be caused to move towards each other when the stack is under compression. If desired, the portion 5 of reduced thickness may be shaped, as indicated in Figs. 2 and 3, provided with lateral projections or otherwise formed to constitute a key or skeleton framework for the resilient material or strip by which it is enveloped.

The invention is applicable to cast, milled, pressed, drawn and other frame members and, in some instances, the marginal edges of the frame member may be bent or pressed to provide the same with a means for restraining the packing material from spreading outwardly. For example, as applied to a frame of relatively thin material, e. g. a pressed frame, a part thereof located a short distance from the inner edge may be bent or pressed upwardly or downwardly and folded upon itself to form a shoulder 12 (Figs. 4 and 5) at one side of the frame. Also, if desired, another part or further parts of the marginal edge may be folded upon itself in order to form an additional shoulder such as the shoulder 13 (Fig. 4) located, for example, at the other side of the frame and/or at its extreme inner edge and the resilient material or strip may be formed so that it envelopes the latter shouldered part or parts.

Alternatively, the frame may be formed so that it is composed in part of a hard or non-compressible material and in part of a resilient or compressible material. For instance, as is indicated in Figs. 6 and 7, the outer edge portion of the frame may be constituted by a strip 15 of metal or other hard material (e. g. hard rubber) and the inner edge portion of the frame may be constituted by a strip 16 of compressible material such as soft rubber which is vulcanised on or otherwise attached to the strip 15.

As applied to a plate-type heat exchanger, the frame member is disposed between the marginal edges of two adjacent plates which may be flat at their marginal edges as indicated in Fig. 8 or they may be shaped to accommodate the frame member. For example, as is shown in Figs. 9 and 10 respectively, the edges of the plates may be L-shaped or formed with a depression 22 and, if desired, a portion of the L-shaped part or depression may be disposed within the inner edge of the frame to restrain the resilient material or strip and to enclose the inner face of the joint between the shoulders of the frame and the adjacent elements or plates. It will be also appreciated that by accommodating the frames in a depression or by turning the extreme outer edges of the plates downwardly as indicated at 25 in Fig. 10 for part or all the length of the plate, the frames can be restrained from movement outwardly.

It will further be appreciated that the inner edges of the transfer ports 4 are preferably formed or provided with a resilient packing strip corresponding with that provided at the inner edge of the frame itself.

Having thus described my invention what I claim as new therein and desire to secure by Letters Patent is:

1. In apparatus of the built-up type, a spacing member consisting of an open frame having resilient packing material disposed around the inner edge thereof and having means carried by said frame for preventing the packing material from spreading relative to said frame in an outward direction when compressed between the marginal edges of adjacent plates.

2. A spacing member according to claim 1 in which the frame is bent to provide the same with the means for preventing the spreading of the resilient material.

3. In an apparatus of the built-up plate type, a spacing member consisting of an open frame the inner marginal edge of which is reduced in thickness to provide shoulders facing inwardly of the frame, and resilient gasket material enveloping the portion of reduced thickness.

4. A spacing member for built-up type apparatus consisting of an open frame of relatively thin metal provided with a shouldered portion disposed a short distance from its inner edge, and resilient gasket material enveloping said inner edge.

5. A plate-type heat exchanger comprising a plurality of generally rectangular heat exchange plates in assembled relation to form a plurality of separate liquid flow channels, a gasket plate interposed between each two heat exchange plates and having a generally rectangular sealing gasket means permanently secured thereto and having its union with the gasket plate completely external to the path of liquid flow in said channels, the plate extending beyond the gasket sufficiently to serve as a rigid beam resisting outward displacement of the gasket and having means carried at its outer periphery to resist outward displacement of the sealing gasket relative to said gasket plate.

6. In apparatus of the built-up type, a spacing member consisting of an open frame having resilient packing material disposed around the inner edge thereof, and a flange carried by the outer periphery of said frame to resist outward displacement of the sealing gasket.

7. In apparatus of the built-up type, a spacing member consisting of an open frame having resilient packing material disposed around the inner edge thereof, a flange carried by the outer periphery of said frame to resist outward displacement of the sealing gasket, and a bead at the inner edge of said frame and embedded in the packing material to more securely retain the packing material on the frame.

8. A spacing member for built-up plate type apparatus, comprising an open frame of T-shaped cross-section in which the stem of the T lies in the plane of the frame and the top of the T surrounds the periphery of the frame, and resilient packing material disposed around the inner edge of said frame.

9. A spacing member for built-up plate type apparatus, comprising an open frame of T-shaped cross-section in which the stem of the T lies in the plane of the frame and the top of the T surrounds the periphery of the frame, a bead formed at the inner edge of the frame, and resilient packing material surrounding the inner edge and the bead of said frame.

10. A spacing member for built-up plate type apparatus, comprising an open frame of hard non-compressible material having resilient rubber gasket material joined to the inner edge of the frame opening, said hard non-compressible material extending outwardly beyond the gasket material sufficiently to serve as a rigid beam resisting outward displacement of the gasket material and being of a thickness substantially equal to the thickness of the gasket in its compressed condition to resist outward displacement of the gasket material relative to the hard non-compressible material.

RICHARD SELIGMAN.